(12) United States Patent
Little et al.

(10) Patent No.: US 7,395,920 B2
(45) Date of Patent: Jul. 8, 2008

(54) METHOD AND APPARATUS FOR A CONVEYED PRODUCT DIRECTING SYSTEM

(75) Inventors: Shawn Little, Big Island, VA (US); Gary Sill, Forest, VA (US)

(73) Assignee: Automated Industrial Technologies, Inc., Forest, VA (US)

( * ) Notice: Subject to any disclaimer, the term of this patent is extended or adjusted under 35 U.S.C. 154(b) by 524 days.

(21) Appl. No.: 11/218,967

(22) Filed: Sep. 2, 2005

(65) Prior Publication Data
US 2007/0051589 A1    Mar. 8, 2007

(51) Int. Cl.
*B65G 21/00* (2006.01)
(52) U.S. Cl. .............................. 198/861.1; 198/370.03; 198/434; 198/448; 198/463.1
(58) Field of Classification Search .............. 198/343.1, 198/343.2, 348, 351, 370.03, 353, 363, 377.03, 198/434, 436, 442, 443, 445, 448, 454, 456, 198/463.1, 636, 798, 800, 803.14, 861.1, 198/861.2, 861.5, 866, 890.1; 414/477.1, 414/754, 774; 193/25 A, 25 E, 25 R
See application file for complete search history.

(56) References Cited

U.S. PATENT DOCUMENTS

| 2,451,104 A | * | 10/1948 | Lowe ........................ 198/442 |
| 3,554,353 A |  | 1/1971 | Raudat |
| 3,822,006 A | * | 7/1974 | Shuttleworth ............... 198/427 |
| 3,830,359 A |  | 8/1974 | Fogelberg |
| 4,066,163 A | * | 1/1978 | Rowekamp .............. 198/418.5 |
| 4,147,248 A | * | 4/1979 | Kurczak et al. ............. 198/358 |
| 4,623,059 A |  | 11/1986 | Agnew |
| 4,723,649 A | * | 2/1988 | Hartness et al. ............. 198/442 |
| 4,880,104 A |  | 11/1989 | Evans et al. |
| 5,174,430 A | * | 12/1992 | Ebira ...................... 198/418.5 |
| 5,937,995 A |  | 8/1999 | Hartness et al. |
| 5,944,165 A | * | 8/1999 | Mannlein et al. ............ 198/442 |
| 6,209,707 B1 |  | 4/2001 | Ronchi |
| 6,223,884 B1 |  | 5/2001 | Ronchi |
| 6,516,938 B1 |  | 2/2003 | Paselsky et al. |
| 6,772,872 B2 | * | 8/2004 | Spangenberg et al. ....... 198/442 |
| 2006/0175179 A1 | * | 8/2006 | Christman et al. .......... 198/442 |

FOREIGN PATENT DOCUMENTS

FR    2849647 A1 *    7/2004

\* cited by examiner

*Primary Examiner*—Jacob Y. Choi
*Assistant Examiner*—William R Harp
(74) *Attorney, Agent, or Firm*—Thomas & Raring P.C.

(57) ABSTRACT

The invention relates to an apparatus and method for directing a conveyed product on a conveyor. The apparatus includes a filing channel that includes the ability to adjust the location of at least one end of the filing channel. In one embodiment, the filing apparatus includes a plurality of cards successively arranged wherein the cards are supported by a support member. The cards define the filing channel and the shape of the channel is maintained despite repositioning at least one end of the filing channel.

15 Claims, 4 Drawing Sheets

METHOD AND APPARATUS FOR A CONVEYED PRODUCT DIRECTING SYSTEM

The present invention relates to a method and apparatus for use with a conveyor for directing and/or redirecting articles on the conveyor.

BACKGROUND

Production, packing, and related industries are highly reliant upon automated systems. Mass production, particularly, requires highly automated systems that are efficient and cost-effective. This is perhaps best actualized in terms of conveyor systems that transport, arrange, and otherwise direct a product being manufactured or altered in a mass production environment.

Conveyor systems are essential to move the product between numerous production stations. Often the stations are themselves automated so that the product must be constantly arranged on the conveyor in order for the production stations to properly engage the product. The flow of articles will typically need to be arranged in a number of rows or columns suitable for the specific production station that operates in conjunction with the conveyor system.

The reliance on the conveyor system is also a production liability. It is known that the conveyed product can become improperly arranged upon the conveyor system. The conveyor system might also upset, tip over, or otherwise displace the product to the point that the product blocks the remaining product flow. A company's margin is often dependent on a high production rate, which is in turn dependent on conveyor line speed, efficiency and utilization. As such, consistent or even intermittent stoppages in production that require human intervention can be a significant financial liability.

One particular problem area of existing conveyor systems is when columns of products exiting a multi-column production station must be consolidated into a lesser number of columns (or vice versa). The conveyor must include a product conveying apparatus that uninterruptedly consolidates a mass or multiple columns of a product so as to rearrange that mass or columns into a new, specific number of columns without any conveyor stops. On the other hand, it may be necessary to take a relatively low number of product columns moving at a high production rate and rearrange them to a larger number of outgoing columns. The production rate at each production station may be different. Increasing or decreasing the number of columns of product presented to each production station accounts for this variance in production capabilities between production stations.

An even more difficult production problem exists where the columns of products at any given point on the conveyor line comprise columns moving at different production speeds. In other words, in a four column system, it may happen that the product in columns 1 and 2 move more quickly than columns 3 and 4. The different production rates may only occur in one zone of the conveyor system. On the other hand, each production station may process each column at different speeds.

It is also known for one or more columns in a multi-column production station to malfunction so that production is stopped for that particular column(s). A product directing system will need to service the quicker moving columns more often than the slow moving production columns. Likewise, it is important for a product directing system to not direct products into a stopped production column until production in that column can be resumed. Nevertheless, existing product directing systems fail to adequately account for these occurrences.

A typical product directing system may include sidewalls bounding the conveyor wherein the sidewalls are angled inwardly to create an increasingly narrow travel path. Dividers can then be arranged to separate the constricted product flow into individual columns. The entry and exit points are largely fixed.

This approach, and other known methods, are highly disposed to upsetting (tipping over) the product, damaging the product, or otherwise jamming or blocking the conveyor system. Other known shortcomings exist. Accordingly, there is a need for a more stable and efficient conveyor directing system and method. The conveyor directing system would ideally act to support the product and would operate in an efficient, simple, and cost-effective manner. A product directing system and method in accordance with the present invention would effectively organize, sort, direct, or redirect an item on a conveyor system, as needed.

SUMMARY OF THE INVENTION

In accordance with the present invention, a method and apparatus is provided for use as a conveyor product directing system. The apparatus includes a set of aligned cards. The cards, in one preferred embodiment, would be four-sided rectangular wafers in that the width and height of each card would exceed the thickness of the card. The cards might be marginally spaced apart or may be in contact with each other to form a stack of cards. Either way, the 'stack' of cards is supported via one or more support members.

The sets or stacks of cards create a specifically shaped passage. The passage will typically mimic the outline of a product being conveyed by the conveyor system. More specifically, a set or sets of cards define a filing channel in the path of the product flow. One or both ends of the filing channel can be adjustably placed in order to engage or deliver products across the width of the product flow. However, relocation of the filing channel's ends does not significantly disrupt the shape of the filing channel as defined by the set or sets of cards. It is envisioned that the product flow could be continuous or selectively interrupted, as needed.

In one embodiment, the filing channel is created by placing two card stacks adjacent to each other. Each adjacent card would include a profile of one-half of the product being conveyed. The profiles are mirror imaged so that a channel is created that mimics the outside dimensions of the conveyed product. In this manner, the product can pass through the filing channel, but the product is supported or closely surrounded in every direction by the conveyor and filing channel.

The product directing system of the present invention effectively addresses at least one of the problems associated with prior art product directing systems. For instance, the product directing system of the present invention precludes the possibility of the directing system tipping over the product during a transition between production stations. The foregoing and additional features and advantages of the present invention will become apparent to those of skill in the art from the following detailed description of a preferred embodiment taken in conjunction with the accompanying drawings.

DETAILED DESCRIPTION

The method and apparatus for the product directing system of the present invention efficiently addresses one or more shortcoming of the prior art, including the inability to sort, direct, position, or otherwise arrange products on a conveyor without upsetting or tipping over the conveyed product. The present system can also be adapted to account for varying production speeds across the width of a conveyor system.

FIGS. 1 through 4 illustrate one or more preferred embodiments of the present invention. Naturally, an engineer having ordinary skill with the assembly of conveyors will be able to create a conveyor directing system that incorporates the teachings of the present invention, but which may look different and incorporate different, alternative parts. The ability to create a moveable or displaceable filing channel makes the present invention very efficient and very different from existing conveyor directing systems that include, for instance, a swinging arm, narrowing sidewalls, and other components unnecessary in the present invention.

Figure 1:
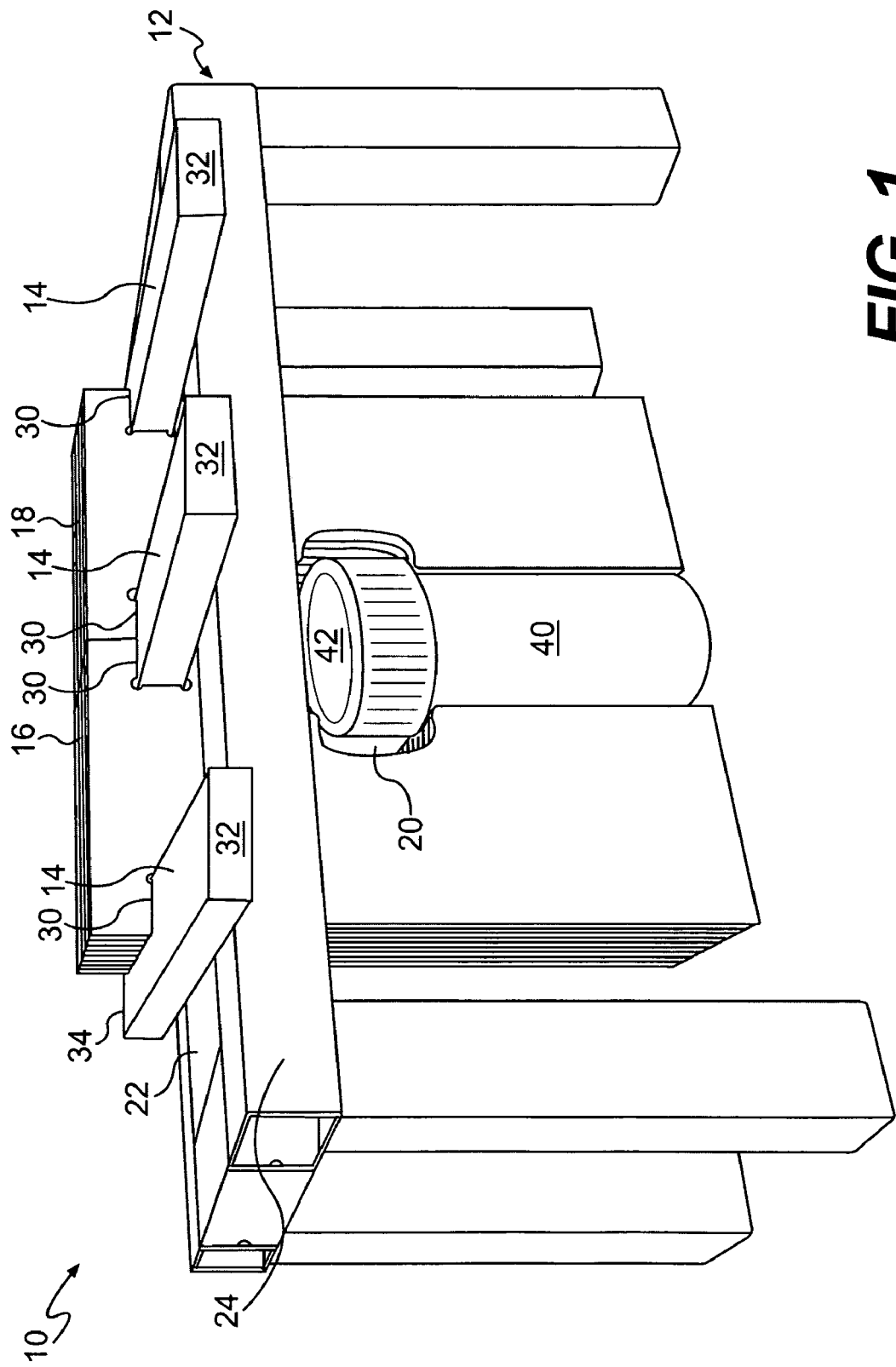
FIG. 1 is a perspective view of a conveyor directing system in accordance with one embodiment of the invention.

Turning to FIG. 1, there is illustrated a product directing system 10 including a frame 12, support arms 14 supported by the frame, two sets of cards 16, 18 supported by the arms, and a filing channel 20 defined by the adjacent sidewalls of the cards. Frame 12 generally acts as a support for arms 14 and can be constructed from any material and in any shape suitable to support arms 14. When filing system 10 is integrated with a conveyor system, frame 12 can be replaced by crossmembers that are mounted directly to the existing conveyor frame. For the purposes of illustrating the invention, the frame is illustrated with four legs arranged in a rectangular pattern. Beams connect the top of each leg to the top of each adjacent leg.

Directing system 10 installed onto a conveyor system would typically include at least a rear cross member 22 and a front cross member 24 to carry arms 14. However, the placement and number of cross members depends on the length of arms 14, the underlying conveyor frame, and other factors specific to the implementation of filing system 10 with a conveyor or production line. The frame is not an essential part of the present invention as other support structures for the arms may be used.

The directing system is not limited to the number of sets of cards that are illustrated in the preferred embodiment of FIG. 1. Each set of cards 16, 18 includes two or more individual cards, as dictated by the requirements, structure or other factors of the associated conveyor system and conveyed product. The individual cards are four-sided wafers, which is to say that the width and height dimensions both exceed the depth or thickness dimension. The cards present a relatively flat cross section. Like the frame, the cards are subject to modification in shape or form, again based on the product and conveyor system that directing system 10 will be used with. The individual cards can be made from any plastics, vinyls, laminates, or materials, either alone or in combination, that can reasonably be shaped so as to be engaged and supported by support arms 14. Typically, the material would be semirigid or rigid. In some instances, a more flexible material may be desired.

It is envisioned, in one preferred embodiment, that the cards in each set will be placed in physical contact with one or more preceding and/or subsequent card. In order to allow these cards to slide past each other during the rotation of the arms, as will be explained further below, the cards would preferably be constructed from a material with a low coefficient of friction. For instance, the cards could be made from cutting or molding rigid UHMWP (Ultra High Molecular Weight Polyethylene), UHMW-PE (Ultra High Molecular Weight Polypropylene), plastics or suitable materials into the proper shape. Suitable materials will be obvious to one skilled in the art.

As briefly mentioned above, the cards are supported by arms 14. Arms 14 could support the cards in a number of ways. One preferred embodiment is that a set of notches 30 are created in the cards either by cutting or during formation of the card. Notches 30 are sized and shaped to accept arms 14. Other arrangements are available, as would be obvious to one of skill in the art. The preferred embodiment is just one available technique.

In the preferred embodiment illustrated in FIG. 1, each arm 14 includes an adjustable end 32 and a fixed end 34. The fixed end would be anchored to a cross member as provided by the conveyor chassis or a stand-alone frame 12, as illustrated in FIG. 1. Fixed ends 34 are bolted, screwed, clamped, or otherwise fastened in place. The mechanism for securing the fixed end 34 will depend, in large part, upon the type and structure of the support member and/or frame used to support adjustable arms 14. The specific mechanism, however, will be obvious to one skilled in the art of conveyor systems and/or conveyor filing systems.

A motor (not shown) activates the set of arms to rotate in a synchronized manner. It would also be possible to have individual motors for each arm. In yet another preferred embodiment, a motor would rotate one arm, such as the center arm, and adjustable ends 32 would be joined to the outer arm so that each arm would rotate equally (see, e.g., FIG. 4). In any event, the arms are parallel to each other along their length.

As can be seen in the illustrated embodiment, filing channel 20 comprises a pattern cut or formed into the sidewall of each card where the pattern mimics the outline of the conveyed product. Where two adjacent sets of cards are used, each card in the respective set would define one half of the pattern. The corresponding card in the adjacent set would include the same pattern in a mirror image. Joining the two patterns creates a profile of the product. The illustrated embodiment includes two sets of cards 16, 18 that are intended to move a pill bottle or top heavy vial 40. Vial 40 includes a top 42 that is of a larger diameter than vial 40. Filing channel 20 has a profile that allows the vial to move along the length of the two stacks of cards. The pattern created in the cards is determined by the conveyed product. The cards are interchangeable when, or if, the conveyed product is changed.

Figure 2:
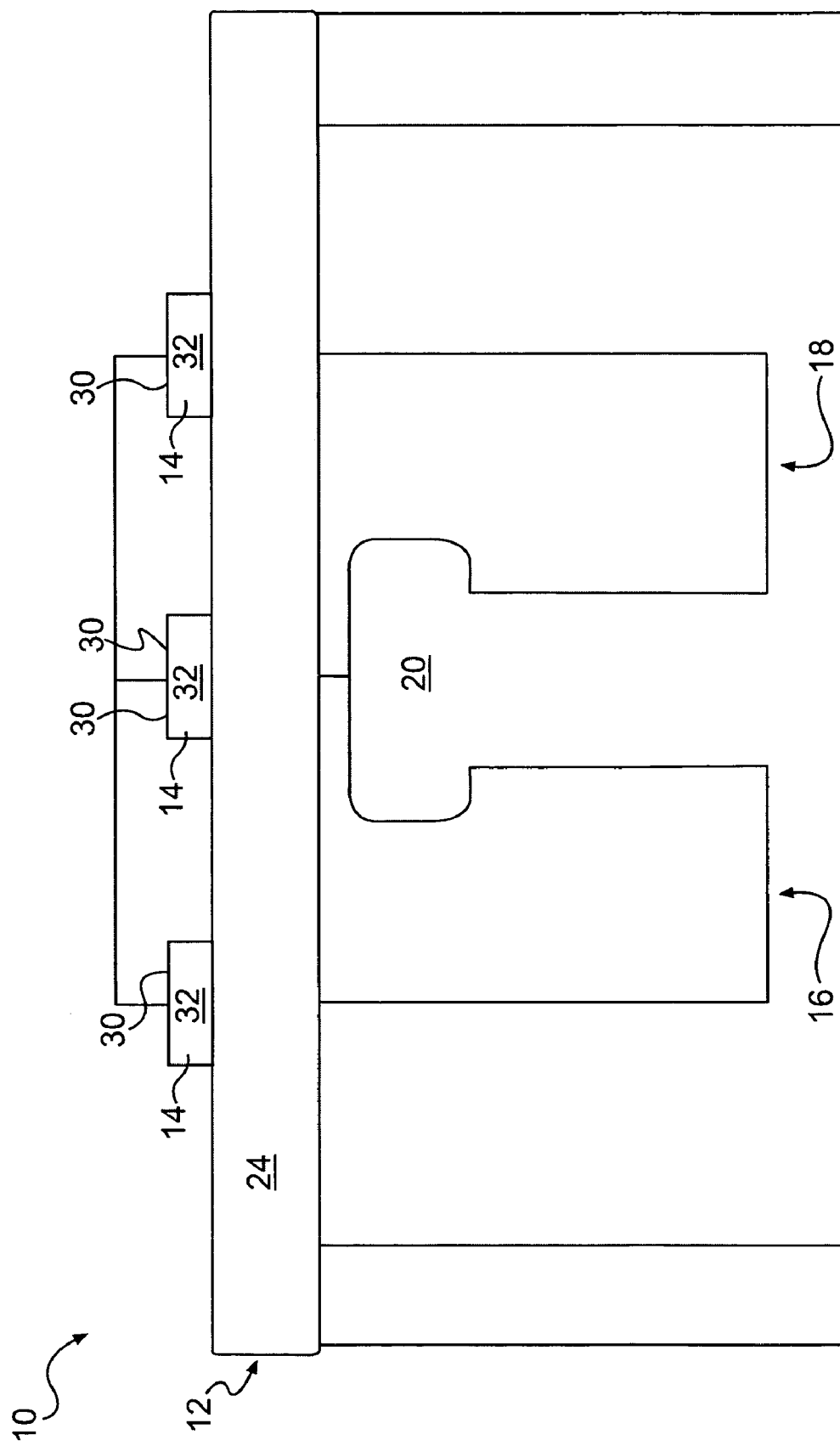
FIG. 2 is front plan view thereof.

FIG. 2 is similar to FIG. 1. Arms 14 are perpendicular to the cross member 24. This means each individual card in the two sets of cards 16, 18 is perfectly aligned with the preceding or subsequent card. In practice, either an undefined mass of products or multiple channels of products would be moving towards the channel on an incoming conveyor. The conveying system 10 would be used to collect the products and direct them onto a single outgoing conveyor. In the illustrated arrangement of FIG. 2, only products moving toward filing channel 20 would pass to the outgoing conveyor. It is, of course, appreciated by one skilled in the art that the direction of travel could be reversed so that a single incoming channel might be outputted to two or more outgoing columns of products.

Figure 3:
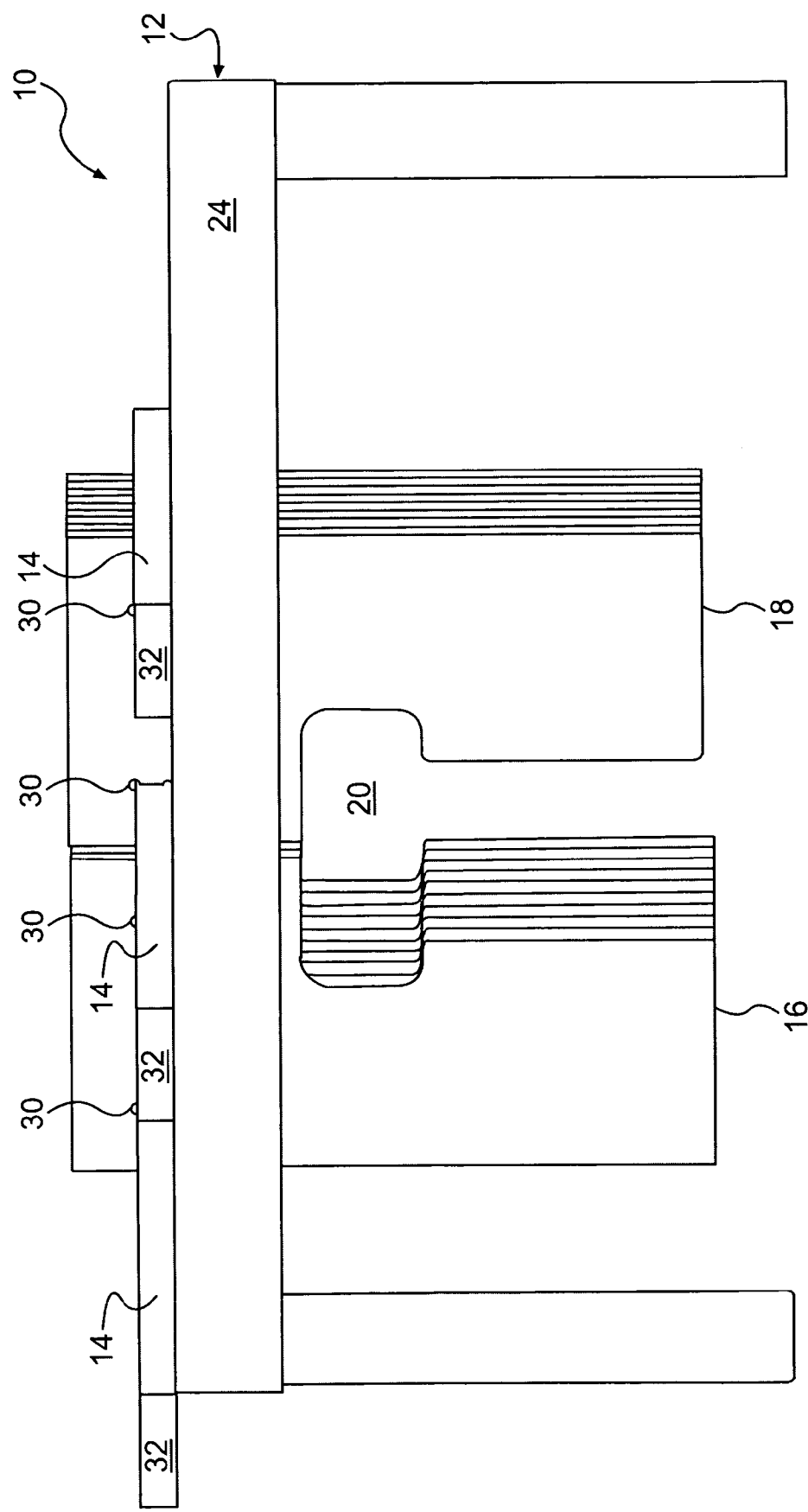
FIG. 3 is an additional front plan view thereof.

In FIG. 3, there is illustrated the directing system 10 wherein arms 14 have been adjusted to, from this perspective, the left. Because the distal ends of arms 14 are secured to frame 12, the rearmost cards barely move, if at all. In contrast, the frontmost cards are displaced the most in relation to the position illustrated in FIG. 2. Each card between the rear card to the front card of each stack is progressively more displaced by the adjustment of arms 14. The cards can slide past each other to facilitate the relative differences in how they are displaced during adjustment of the support arms 14. While there is a slight offset between the edges of each successive card in the set once the set is rotated, the overall effect is that filing channel 20 maintains the profile as if the cards were all aligned. The offset between the cards can be lessened by reducing the thickness of each card, as necessary.

In another preferred embodiment of the invention, both ends of arms 14 are adjustable. In particular production scenarios, it will be necessary to balance multiple incoming columns of products with multiple outgoing columns of products. The production speed of each column will be dependent on the production stations, mechanical reliability, and the like. Providing arms 14 that can be adjusted at both ends, allows directing system 10 to balance a product from the one side of a conveyor system all the way across to the second side of the conveyor system. The distance traveled for the product is effectively increased. Yet, the filing channel 20 maintains a near constant shape that accommodates the conveyed product at all times. The embodiment of FIG. 4 illustrates a directing system wherein both ends of arms 14 are adjustable across the width of the conveyor system.

Figure 4:
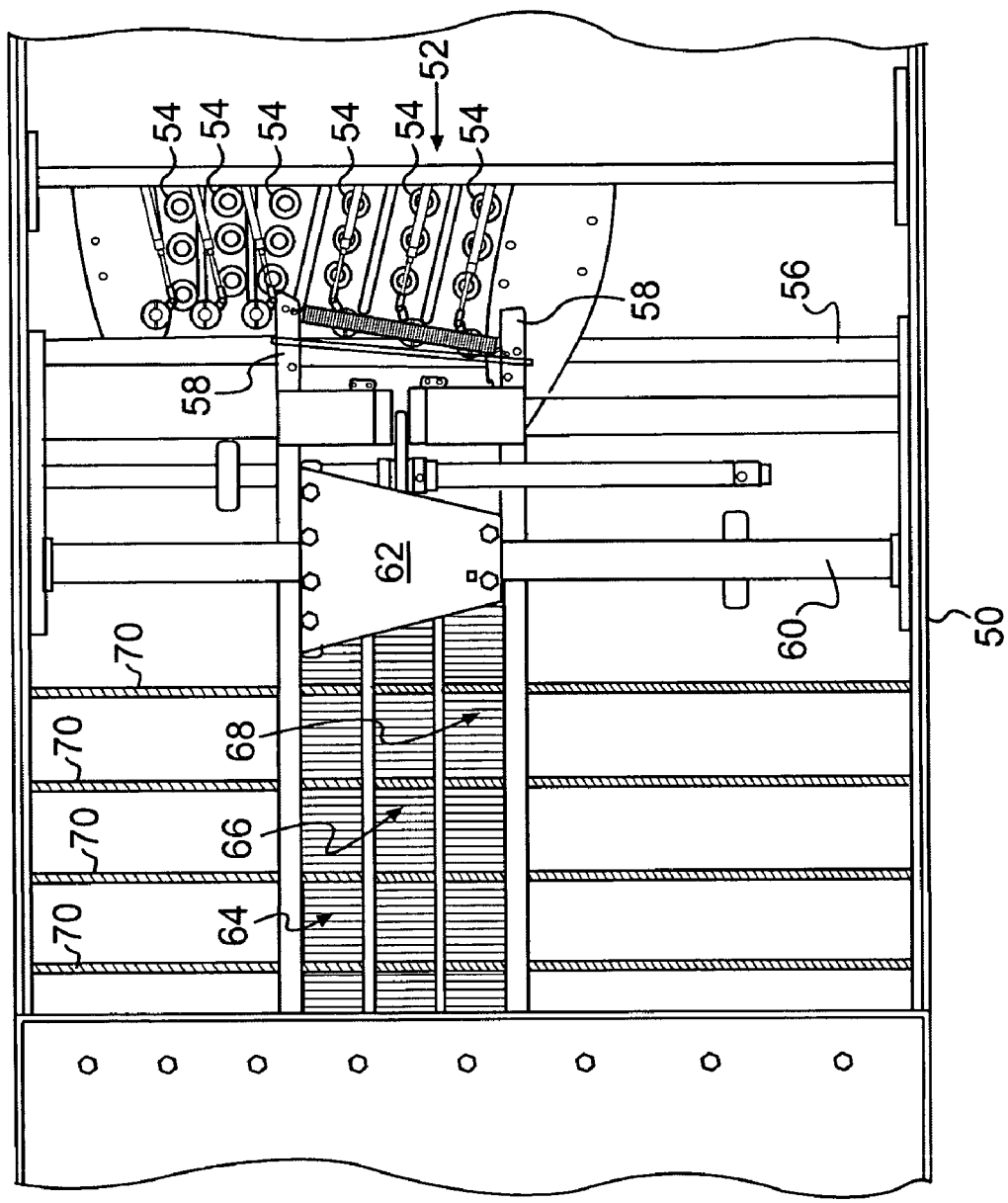
FIG. 4 is a top plan view of one embodiment of the present invention as it might be installed in an industrial application.

In greater detail, FIG. 4 illustrates one embodiment of the present invention in use with a conveyor system. A conveyor frame 50 includes a direction of travel, as identified by arrow 52 (i.e., right to left). A number of conveyed products 54 create a product flow. The conveyor carrying the incoming product is the incoming conveyor in relation to the directing system.

A cross member 56 supports arms 58, as discussed above. A main support beam 60 includes a sliding, motorized carriage 62 that is operable to adjust arms 58. Three sets of cards 64, 66, 68 are included. Cards within set 66, or the middle set, would cooperate on each side to form a product profile with adjacent cards in other two sets. Therefore, there are two filing channels (not shown). The system is adaptable to include more or less filing channels.

In use, the multiple incoming columns are physically separated and include mechanized or automated stops (not labeled) to block the progress of the individual products 54, as necessary. Such stops are common the art and would be obvious to one of skill in the art. Arms 58 are then positionally adjusted so that the filing channels are in position to engage the appropriate incoming product column(s). The filing channels are arranged as needed and as directed by a computerized control system (not shown). Unlike the description of the preferred embodiment in FIGS. 1-3, the ends of arms 58 adjacent the outgoing conveyor product columns (not shown) can also be positionally adjusted so that the conveyed products can be deposited into the appropriate column on the outgoing conveyor.

A plurality of guide bars 70 cross conveyor frame 50 to divide stacks 64, 66, 68 into sub-stacks. It has been found that as stack size increases (i.e., the number of cards forming a stack increases), adjusting the ends of arms 58 can lead to cards within the stacks tipping over or rotating. Bars 70 are located so as to not block the filing channel(s). The cards can slide along the bars, if necessary, while bars 70 keep the cards relatively perpendicular to the incoming product flow. Bars 70 may also be constructed so as to support arms 58.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A product directing system comprising:
   a conveyor;
   at least one product to be conveyed, the conveyor providing a product flow;
   a filing channel placed along the product flow, the filing channel shaped according to the outline of the at least one product;
   a plurality of cards successively arranged along the path of the product flow, the cards defining the filing channel; and
   a mechanism to adjust the location of at least one end of the filing channel while substantially maintaining the shape of the filing channel.

2. The product directing system of claim 1 wherein the mechanism supports the plurality of cards in the product flow.

3. The product directing system of claim 2, wherein the mechanism comprises at least one support arm, the cards supported by the support arm.

4. The product directing system of claim 3, wherein each card of the plurality of cards is in contact with at least one other card.

5. The product directing system of claim 4, wherein each card of the plurality of cards is slidably arranged to at least one other successively arranged card.

6. The product directing system of claim 1, further comprising at least one guide bar, the at least one guide bar arranged to divide the plurality of cards into more than one stack of cards.

7. A product directing system comprising:
   a conveyor;
   a product to be conveyed via the conveyor, the conveyor providing a product flow;
   a plurality of cards successively arranged along the path of the product flow;
   a support member supporting the cards, the positioning of support member being adjustable in order to adjust the location of the cards;
   a filing channel created by the cards, the filing channel shaped to allow a product from the product flow to pass through the channel; and
   wherein the shape of the filing channel is substantially maintained during positional adjustment of the cards.

8. The product directing system of claim 7, wherein each card of the plurality of cards is in contact with at least one card.

9. The product directing system of claim 8, wherein each card of the plurality of cards is slidably arranged to at least one other successively arranged card.

10. The product directing system of claim 7, the filing channel shape further comprising a shape intended to mimic the outline of the conveyed product.

11. The product directing system of claim 7, wherein the support member is an elongated arm, the cards secured to the elongated arm.

12. The product directing system of claim 7, further comprising at least one guide bar, the at least one guide bar arranged to divide the plurality of cards into more than one stack of cards.

13. A method of directing products conveyed by a conveyor, the method comprising:
   placing a product on a conveyor;

creating a filing channel in the shape of the profile of the conveyed product;

placing a plurality of cards along the path of the conveyed product;

passing the conveyed product through the filing channel; and adjusting the position of at least one end the filing channel.

14. The method of claim 13, further comprising the step of selectively stopping the conveyed product.

15. The method of claim 13, further comprising the step of substantially maintaining the shape of the filing channel during the step of adjusting the position of at least one end of the filing channel.

* * * * *